R. T. NEWTON.
VEHICLE ACCESSORY.
APPLICATION FILED AUG. 25, 1919.
1,427,624.    Patented Aug. 29, 1922.
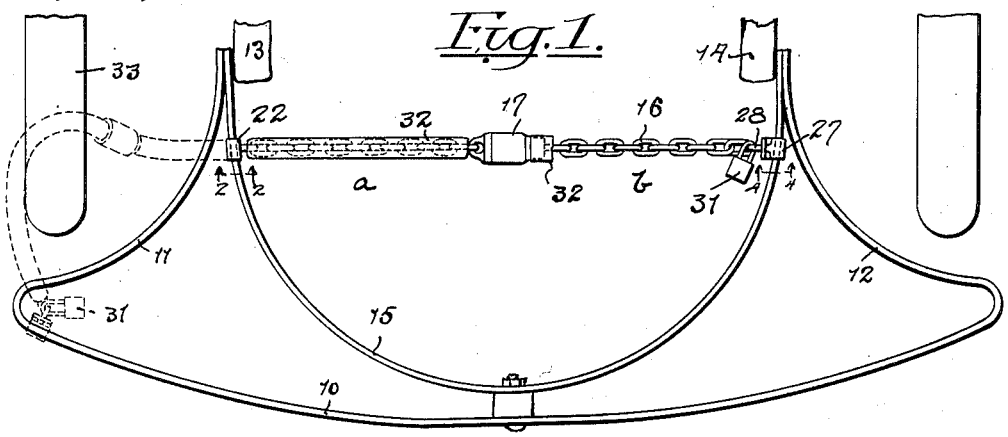
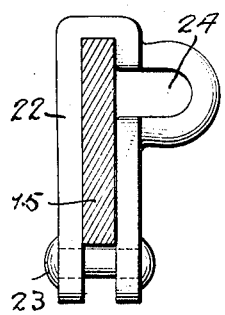
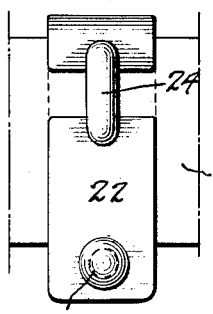
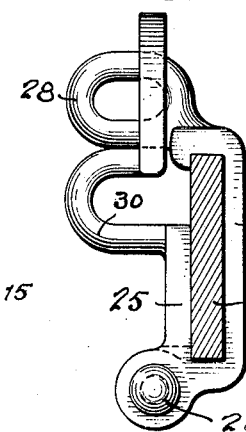
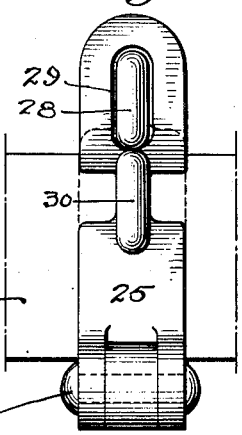
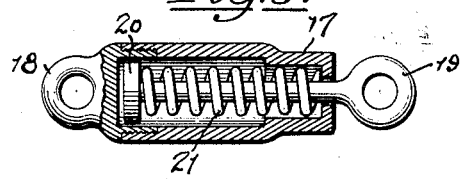
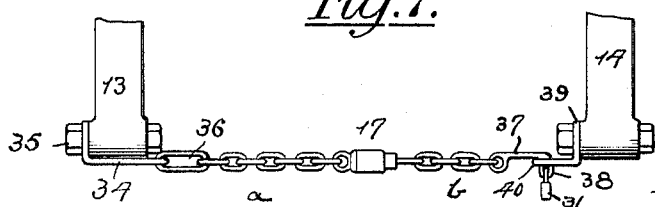
Inventor:
RICHARD T. NEWTON
by his Attorneys,

UNITED STATES PATENT OFFICE.

RICHARD T. NEWTON, OF NEW YORK, N. Y.

VEHICLE ACCESSORY.

1,427,624. Specification of Letters Patent. Patented Aug. 29, 1922.

Application filed August 25, 1919. Serial No. 319,561.

*To all whom it may concern:*

Be it known that I, RICHARD T. NEWTON, a citizen of the United States of America, and residing in the city, county and State of New York, have invented certain new and useful Improvements in Vehicle Accessories, of which the following is a specification.

My invention relates to a vehicle accessory, and particularly to a locking chain accessory for automobiles. The particular object of my invention is to provide a locking chain adapted to form a bumper element, or simply a locking device where its use as a bumper element is not practicable or desirable.

In the accompanying drawings—

Fig. 1 is a plan view of a bumper, with which is associated a locking chain in accordance with the present invention;

Fig. 2 is a section on the line 2—2 of Fig. 1, showing one of the chain attaching brackets;

Fig. 3 is a front elevation of this bracket;

Fig. 4 is a section on the line 4—4 of Fig. 1, showing the detachable bracket for one of the chain ends;

Fig. 5 is a front elevation of this bracket;

Fig. 6 is a longitudinal section through an extension spring link arranged in the chain length; and Fig. 7 is a plan of a modified embodiment of the invention.

While I am aware that locking chains of various types have been employed for securing automobiles against theft, these chains have hitherto been used as entirely independent elements, usually carried in the tool box of the car. By the present invention I have provided a chain which may be utilized in some instances, not only to lock the car, but also as a bumper element.

The particular bumper arrangement with which the chain is associated in Fig. 1, is not material to the present invention, but I have illustrated a bumper of well known type, comprising an impact member 10 of flat spring steel, the opposite ends of which are re-curved at 11 and 12 and secured to the chassis side bars 13 and 14 in any suitable way. A reinforcing arch 15, also of spring strap metal, extends from the chassis side bars to the mid area of the impact bar, to which it may be secured in any suitable way. As here shown the chain 16 which stretches between the inner ends of the arch strap 15, forms a bumper element in the position shown in full lines in Fig. 1, and a car locking element in the position shown in dotted lines in Fig. 1. The chain 16, which may be substituted by any suitable flexible member, is here shown as comprising two lengths *a* and *b* united at the middle of the chain by the spring link 17, the length *a* being attached to the casing element of the link at 18 and the other length *b* being attached to the plunger 19 between the head 20 of which and the end of the casing is interposed the spring 21.

The opposite end of the length *a* of the chain is secured rigidly to one side of the reinforcing arch 15 by means of a bracket 22, shown on an enlarged scale in Figs. 2 and 3. The legs of this bracket embrace the reinforcing arch 15 and are tied together beneath the latter by any suitable means, such as a rivet 23. The inner leg of the bracket is bowed out to form an eye 24, through which the end link of the length *a* of the chain is engaged. Preferably the width of the bracket legs is such that they may be passed through the link and the latter threaded into the eye 24 of the bracket. At the opposite end of the chain, the section *b* engages the hasp-like arm 25 pivoted at 26 to the body of the bracket 27 mounted on the other side of the arch strap 15. At the upper end of the body of the bracket 27 an eye 28 is formed which passes through a hole 29 in the hasp arm 25. The free end of the hasp is connected to the pivoted lower end thereof by a bowed portion 30, which accommodates the end link of the section *b* of the chain. The shackle of a padlock 31 may be passed through the eye 28 of the bracket to lock the bracket to the arch 15.

Preferably the chain is of such length that it is necessary to place the spring 21 under some tension in order to bring the hasp 25 into locking position, so that all of the parts are held under tension and free from rattle. I prefer for the sake of appearances and also to minimize rattle, to cover the chain with a leather sheath 32, which may encase the spring link 17 or cover only each of the chain lengths *a* and *b*.

When the chain is in the position shown in full lines in Fig. 1, it is obvious that it not only reinforces the legs of the spring reinforcing arch 15 against deflection, but that in case of heavy impact against the bumper, so that the latter is driven inward, the chain is directly engaged and resists the thrust, forming a rigid stop after the spring 21 has been fully compressed. It thus affords an added feature of security and strength to the bumper structure.

When it is desired to lock the car the padlock 31 is opened and its shackle drawn out of the eye 28 of the bracket 27, whereupon the hasp 25 swings open and the bracket may be removed from the reinforcing arch 15. The free end of the chain is then passed between spokes of the wheel 33 and the bracket clamped to any convenient available support. I have here shown it clamped to the impact member 10 of the bumper and held in fast position by the re-engagement of the padlock 31 with the eye 28 of the bracket after the hasp 25 has been swung up into position. The wheel is now locked and it is impossible to drive the car without breaking the chain.

In the modification shown in Fig. 7 I have shown the chain attached directly to the chassis side bars 13 and 14, rather than to a bumper carried by the chassis. In this construction the length $a$ of the chain is provided with a bracket 34 adapted to be secured to the chassis side bar 13 by the vehicle spring bolt 35. In this section of the chain is arranged an abnormally long link 36 for a purpose hereinafter stated. The section $b$ of the chain terminates in a solid link 37, one end of which is offset to form a tongue 38 pierced to receive the shackle of the bolt 31. Associated with this end of the chain is a bracket 39, the arm 40 of which is pierced to permit the tongue 38 of the link 37 to pass therethrough.

In this construction it is obvious that the chain acts as a bumper and constitutes the sole element thereof. If the spring link 17 have a sufficiently strong spring 21 considerable resiliency may be secured to cushion the shock of impact against the chain. In any event the spring serves to take up slack in the chain and prevent rattle.

When it is desired to use the chain as a locking device the padlock 31 is freed from the link 37, and the latter withdrawn from engagement with the bracket 38 and passed between the spokes of the wheel adjacent the chassis side bar 13 and brought back to a position in which the tongue 38 may be passed through the long link 36. Upon engaging the padlock 31 to the tongue 38 of the link 37 the wheel is locked and the vehicle cannot be driven without breaking the chain.

If it is not desired to use the chain as a bumper element it may be secured at one end to any suitable point on the car which will permit the other end of the chain to be passed between the spokes of a wheel and brought back so that the tongue of link 37 may be passed through the long link 36, and the padlock 31 engaged therewith to hold the chain in locking position.

Various modifications of detail in construction will readily occur to those skilled in the art without departing from what I claim as my invention. It is to be understood that in the following claims I use the term "chain" in a sense broad enough to include any equivalent therefor, such as a steel cable or the like.

I claim—

1. The combination with a vehicle bumper susceptible of deflection toward the vehicle body under impact strains, of a chain arranged transversely of the vehicle in the plane of the bumper and between the latter and the vehicle body, and adapted to be engaged by the bumper on deflection of the latter and to form a substantially rigid stop limiting the deflection of the bumper toward the vehicle body.

2. The combination with a vehicle bumper susceptible of deflection toward the vehicle body under impact strains, of a substantially rigid element carried by the bumper and arranged transversely of the vehicle in the plane of the bumper between the impact portion of the latter and the vehicle body, said rigid element being adapted for engagement by the impact portion of the bumper on deflection of the latter and to form a substantially rigid stop limiting the deflection of the bumper toward the vehicle body.

3. As a vehicle accessory, a chain fixedly secured at one end to a vehicle member, and means for supporting the same in transverse position across one end of the vehicle to serve as a bumper element, together with means for locking said chain in engagement with a vehicle member to prevent travel of the vehicle.

4. As a vehicle accessory, a chain, means for fixedly securing one end thereof to a member at the side of one end of the vehicle, means for detachably connecting the other end of the chain to a member at the opposite side of said end of the vehicle, and means to lock said chain in engagement with a wheel at the side of the vehicle to which one end of the chain is fixedly secured.

5. The combination with a vehicle bumper, of a chain extending between the opposite sides of the bumper, and means for detachably engaging said chain at one end from the bumper to permit the chain to be engaged with a vehicle member to lock the vehicle against travel.

6. The combination with a vehicle bumper of a chain, means to fixedly secure one end of the chain to the bumper, and means to detachably secure the other end either to the opposite side of the bumper to reinforce the bumper, or to the same side of the bumper as the fixed end when the chain is in locking engagement with a vehicle wheel.

In testimony whereof I have signed my name to this specification.

RICHARD T. NEWTON.